April 9, 1968   C. Y. WELLES   3,376,763
BORING TOOLS
Filed Nov. 19, 1965
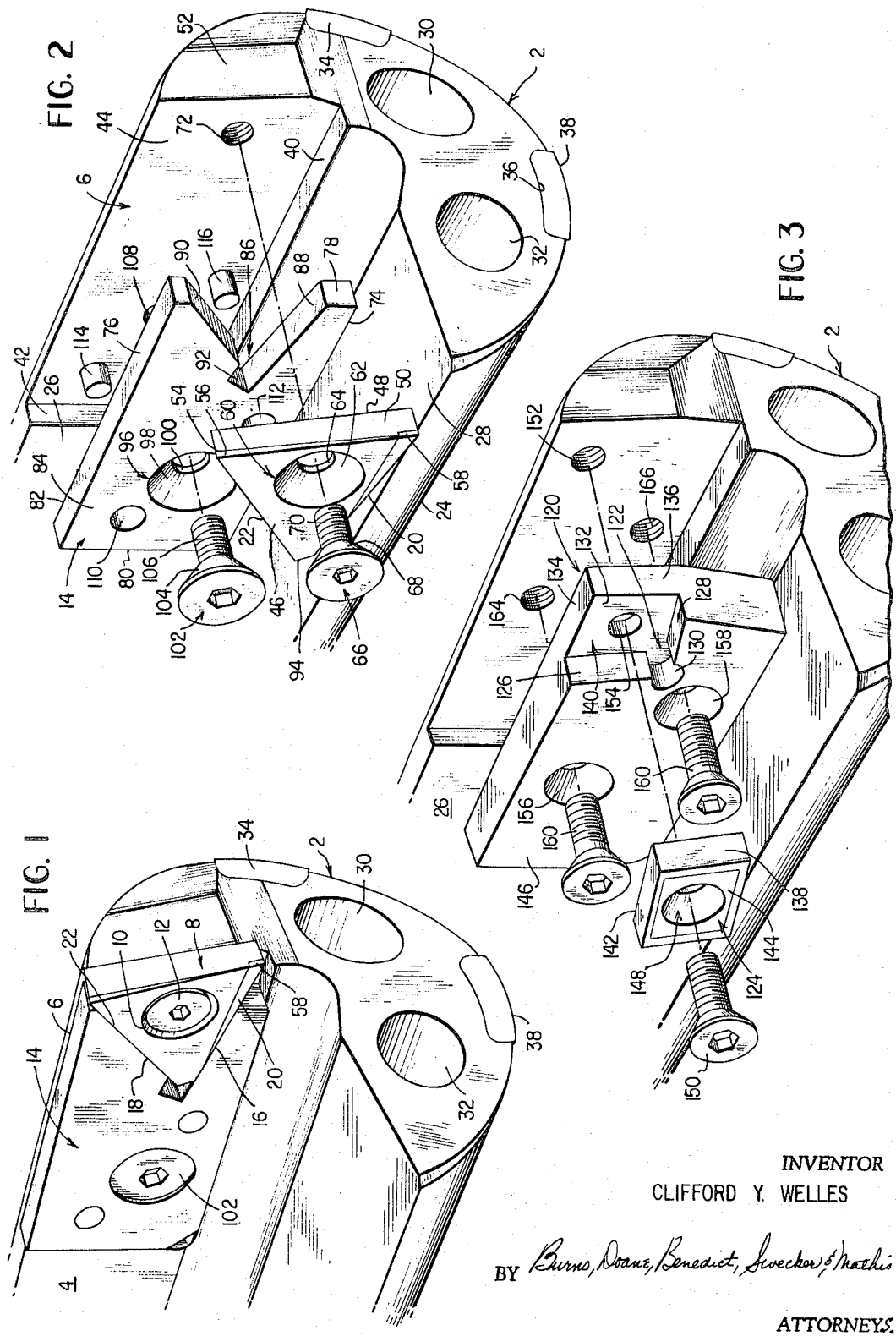
INVENTOR
CLIFFORD Y. WELLES
BY *Burns, Doane, Benedict, Swecker & Mathis*
ATTORNEYS.

United States Patent Office 3,376,763
Patented Apr. 9, 1968

3,376,763
BORING TOOLS
Clifford Y. Welles, Duncan, Okla., assignor to Halliburton Company, Duncan, Okla., a corporation of Delaware
Filed Nov. 19, 1965, Ser. No. 508,645
2 Claims. (Cl. 77—58)

ABSTRACT OF THE DISCLOSURE

A boring tool which includes a rod having a longitudinally extending base and a polygonal cutting element mounted on the base. The cutting element includes a mounting hole with connector means passing through the hole for detachably connecting the cutting element with the base. A supporting plate rigidly and detachably secured to the base includes at least one abutting edge abutting a peripheral edge of the cutting element to prevent rotational movement thereof about the connector means. The cutting element and the supporting plate include outer surfaces lying in a common plane.

---

This invention relates to boring tools. In particular, the invention relates to boring tools used to enlarge the diameter of deep holes in metal where the length of the hole is considerably greater than the diameter thereof.

In enlarging the diameter of an already formed deep hole, it is frequently advantageous to use a boring tool provided with a replaceable cutting element. In using a boring tool of this type, it is important that the boring tool should be provided with a sufficiently rigid mounting for the cutting element to prevent movement of the cutting element relative to the tool during boring.

One mounting previously utilized to support the cutting element of a boring tool provides spaced resilient clamping portions on the tool in abutting frictional contact with a portion of the cutting element, on two opposed planar surfaces thereof.

Such a mounting, wherein movement of the cutting element relative to the boring tool is restrained by the frictional clamping action of the clamping portions on the cutting element, may prove unsatisfactory for a number of reasons. For example, the loads imposed on the cutting element during boring may sometimes be sufficient to overcome the frictional forces exerted on the cutting element by the clamping portions, thereby permitting the cutting element to move relative to the tool.

A particular problem arises when, as sometimes happens, conditions of heat and vibration encountered during boring cause the material forming the clamping portions to lose its natural resilience. In the event the clamping portions can no longer maintain their full clamping action and movement of the cutting element relative to the tool may occur.

Another problem arising from the use of clamping portions is that they may obstruct chip material removed by the cutting element during boring in its passage over and away from the cutting element.

In recognition of the need for an improved boring tool provided with a replaceable cutting element, it is therefore a general object of the present invention to provide a boring tool which substantially obviates or minimizes problems such as those previously mentioned.

It is another object of the present invention to provide a boring tool having a replaceable cutting element wherein movement of the cutting element relative to the tool during boring is particularly effectively prevented.

It is a special object of the invention to provide a boring tool provided with a replaceable cutting element, uniquely constructed so that movement of the cutting element relative to the boring tool during boring is prevented, despite conditions of heat and vibration encountered during boring.

It is yet another object of the invention to provide a boring tool provided with a replaceable cutting element so constructed that chip material removed by the cutting element during boring may pass freely away from the cutting element.

These objects are accomplished in accordance with preferred embodiments of the invention which are characterized by a rod having a longitudinally extending base. A replaceable, polygonal cutting element provided with a mounting hole is connected with the base by connector means passing through the mounting hole. At least a portion of the cutting element projects outwardly laterally of the base. A supporting plate is rigidly and detachably secured to the base. The supporting plate includes at least one edge abutting a peripheral edge of the cutting element so as to restrain the cutting element against rotational movement about the connector means.

Preferred embodiments of the invention are illustrated in the accompanying drawings in which:

FIG. 1 is a perspective view of one preferred embodiment of a boring tool according to the present invention;

FIG. 2 is an exploded perspective view of the boring tool shown in FIG. 1; and

FIG. 3 is an exploded perspective view of a boring tool according to a seond preferred embodiment of the present invention.

Referring to FIG. 1 of the drawings, the embodiment there shown comprises a rod-like, tool body 2 provided with a longitudinally extending base 4. The base 4 is provided with a base recess 6 adjacent the forward extremity of the base. A replaceable cutting element 8 having a polygonal periphery is positioned on the base within the recess 6, with a portion of its periphery extending outwardly of the tool body in a cutting position. The cutting element is provided with a countersunk mounting hole 10 which receives connecting means 12, connecting the cutting element 8 to the base 4. A supporting plate 14, is detachably connected to the base, within the base recess. The supporting plate includes two, mutually inclined edges 16 and 18 abutting the cutting element along the adjacent peripheral edges 20 and 22 thereof so as to restrain the cutting element against rotational movement about the connector.

Referring in more detail to FIG. 2, the boring tool body 2 comprises a rod 24 provided with a longitudinally extending V-slot defined by a radially and longitudinally extending base surface 26 of the base 4 and a radially and longitudinally extending outer surface 28 obtusely inclined to the base surface 26.

The body 2 is provided with a longitudinally extending passage 30 through which lubricating fluid may be directed to the cutting element 8 during boring. A longitudinally extending joining hole 32 is additionally provided in the tool body for receiving connectors joining the tool body to a gun drill rod shank, or the like (not shown), in a conventional fashion.

To center and support the boring tool within the hole being bored, a plurality of wear strips 34 is provided. For this purpose the outer peripheral surface of the tool body is provided with a plurality of radially spaced, longitudinally extending slots 36 of generally rectangular cross section. Each slot receives a longitudinally extending, wear strip 34 of generally rectangular cross section provided with a curved outer surface 38 which projects radially of the periphery of the tool body. The wear strips 34 abut the surface of the bored hole and accurately locate and center the tool in the hole during boring. The wear strips 34 are formed from a suitable hardened material in order to extend the life of the tool.

The base 4 adjacent its forward extremity, is additionally provided with the earlier noted, generally rectangular base recess 6 defined by a longitudinally mounting edge 40 extending longitudinally of the base, a lateral mounting edge 42 extending laterally from the rear extremity of the longitudinal mounting edge 40, and a base recess face 44, parallel to the base surface 26, and perpendicular to the mounting edges 40 and 42. The base recess face 44 extends laterally from the longitudinal mounting edge 40 to the periphery of the tool body, and longitudinally from the lateral mounting edge 42 to the surface of the forward extremity of the tool.

The replaceable cutting element 8 is positioned on the base within the base recess 6 adjacent the forward extremity thereof. In the preferred embodiment, the replaceable cutting element is of generally equilateral, triangular form and comprises spaced parallel, planar inner and outer side surfaces 46 and 48 bounded by a forward edge 50 and by the previously noted rearward edges 20 and 22.

The inner side surface 48 of the cutting element abuts the base recess face 44 with the outer side surface 46 being in the plane of the surface of the base 26. Each edge of the cutting element 8 is perpendicular to the side surfaces of this element. In a cutting position of the cutting element, the forward edge 50 is positioned forwardly of the forward extremity of the tool body extending laterally outwardly therefrom at a rearward inclination to the longitudinal axis of the tool.

In order to support the forward edge of the tool during cutting, an inclined end face 52 is provided on the end surface of the tool body, generally parallel to and spaced rearwardly from the forward edge 50 of the tool.

An outer apex 54 of the cutting element 8, defined by the laterally outer rearward edge 22 and the forward edge 50 is positioned laterally outwardly of the base in a cutting position. A cutting edge 56 is provided on the cutting element at the outer apex 54. The cutting element is additionally provided with a cutting edge at at least one other apex 58 of the cutting element on the outer side surface so that a fresh cutting edge may be presented to the work later during the course of the boring operation, in a manner to be described.

The cutting element includes a mounting hole 60 comprising a conical countersunk portion 62 extending inwardly of the outer side surface of the cutting element, intersecting a concentric bore portion 64 of uniform diameter extending from the inner side surface of the cutting element.

Connecting means 12, as shown in FIGURE 1, may comprise a connector 66 including a correspondingly shaped conical head 68 in abutting contact with the conical countersunk portion 62 of the mounting hole 60. The connector is provided with a threaded portion 70 engaging a threaded hole in the base 72. The connector 60 secures the cutting element 8 to the base 4 and prevents linear movement of the cutting element 8 relative to the base 4 under the loads imposed on the cutting element 8 during boring, in a positive manner.

The outer extremity of the connector 60 is positioned below the outer side surface 46 of the cutting element 8 so as to present no obstruction to the free passage of chip material removed by the cutting element during boring.

Although a mounting hole having a countersunk portion of conical shape has been disclosed it will be appreciated that a countersunk portion of uniform diameter, or of any other suitable profile, adapted to receive a correspondingly shaped head on the connector may be provided.

Although the preferred embodiment has been disclosed with reference to a cutting element having a periphery of triangular form, it will be appreciated that a cutting element having a periphery of any polygonal form such as, for example, square or hexagonal, may be provided.

Suitable materials for the cutting element include tool steels, sintered carbides, alloy steels, and the like. It will also be appreciated that cutting edges at the apexes of the cutting element may be provided on both side surfaces of the cutting element so that the cutting element may be turned over when the cutting edges on one side surface have become successively blunted to present a fresh set of sharpened cutting edges.

To prevent rotational movement of the cutting element 8 about the connector 66 during boring, the notched supporting plate 14 is provided. The supporting plate 14 comprises a parallel sided, generally rectangular plate defined by spaced, opposed inner and outer longitudinal edges 74 and 76 and spaced opposed forward and rear lateral edges 78 and 80. The supporting plate 14 includes an inner planar side surface 82 in abutting contact with the base recess face 44 and an outer side surface 84 in the plane of the surface of the base. The outer longitudinal edge 76 of the supporting plate extends along the outer longitudinal edge of the base recess. The inner longitudinal edge 74 and the rearward lateral edge 80 of the supporting plate 14 abut the longitudinal mounting edge 40 and the lateral mounting edge 42 of the base recess respectively.

In order to receive the cutting element, a notch is provided in the supporting plate. The notch is defined by an inner inclined face 88 of the edge 16 inclined rearwardly and laterally outwardly from the forward lateral edge 78 adjacent the inner lateral extremity thereof and an outer inclined face 90 of the edge 18 inclined rearwardly and laterally inwardly from the forward lateral edge 78 adjacent the outer lateral extremity thereof. Edge faces 88 and 90 are perpendicular to the plate sides 82 and 84.

The inner and outer inclined edge faces 88 and 90 of the supporting plate abut the planar faces of the adjacent inner and outer rear edges 20 and 22 of the cutting element 8. The abutting action of either one alone of the inner and outer inclined edge faces 88 and 90 of the supporting plate against the corresponding edges 20 and 22 of the cutting element is sufficient to prevent rotational movement of the cutting element 8 about the connector 66 in a simple and effective manner.

The supporting plate is additionally provided with a recess 92 connecting the adjacent rearward extremities of the inclined upper and lower edge faces 88 and 90 and within which an apex 94 of the cutting element, defined by the inner and outer rear edges 20 and 22 of the cutting element 8, is partially received. Although the recess 92 disclosed in the preferred embodiment is of square cross section it will be appreciated that a recess of any desired cross section may be provided.

The supporting plate 14 includes a mounting hole 96 comprising a conical counter sunk portion 98 extending inwardly of the outer side surface 84 of the supporting plate intersecting a concentric bore portion 100 of uniform diameter extending from the inner side surface 82 of the supporting plate 14. A connector 102 including a correspondingly shaped conical head 104 in abutting contact with the conical countersunk portion 98 of the mounting hole 96 extends therethrough. The connector includes a threaded portion 106 engageable with a threaded mounting hole 108 in the base 4.

It will be appreciated that a countersunk portion 98 of any suitable profile, such as for example, of uniform diameter, adapted to receive a correspondingly shaped head on the connector, may be provided.

The outer extremity of the connector 102 is positioned below the outer side surface 84 of the supporting plate so as to present no obstruction to chip material removed during boring, in its passage from the cutting element 8.

Additional, two locating holes 110 and 112 are provided in the supporting plate spaced radially of the mounting hole, for receiving locating dowels 114 and 116 secured to and extending outwardly from the base 4.

It will be appreciated that the abutting longitudinal and lateral edges of the base recess and the supporting plate impart great rigidity to the supporting plate in its attached position within the base recess during boring, and effectively prevent any movement, linear or rotational of the supporting plate relative to the supporting plate connector 102.

When it is desired to change the cutting edge of the cutting element in use, the boring tool is withdrawn from the hole, and the connector 66 securing the cutting element 8 to the base 4 is removed so that the cutting element 8 may be lifted out of the notch 86 in the supporting plate, rotated so as to place another cutting edge in cutting position and then replaced in the notch 86 and reconnected to the base 4. The mounting thus provides for easy removal and accurate relocation of the cutting element whenever it is necessary to place a fresh cutting edge in the cutting position at the correct diameter of cut. Moreover, it is not necessary to readjust the position of the supporting plate 14 during the change.

It will be appreciated that the cutting diameter of the tool is dependent on the amount by which the cutting edge projects laterally outward of the tool body, and that the amount of this projection is dependent in turn on the angular position of the cutting element 8 about the central connector 66. This angular position is dependent upon the position and inclination of the inclined edges 20 and 22 on the supporting plate 14. By providing a plurality of replaceable, detachable supporting plates differing in the relative inclinations of their inclined edges 20 and 22 to the longitudinal axis of the tool, it is possible to change the cutting diameter of the tool by changing the particular supporting plate used.

A second embodiment of the invention utilizing a notched supporting plate 120 underlying and supporting the cutting element is disclosed in FIG. 3. The supporting plate 120 shown in FIG. 3 includes a notch 122 intended to receive a cutting element 124 having a square periphery.

The notch 122 is defined by edges including a lateral edge 126 spaced rearwardly from the forward extremity of the supporting plate and extending laterally inwardly from the outer longitudinal edge of the supporting plate, and generally facing the drilling end of the tool. Another notch edge 128 is spaced laterally inwardly from the outer longitudinal edge of the supporting plate, and extends rearwardly from the forward extremity of the supporting plate, and faces generally outwardly, a recess 130 intersecting the extremities of the edges 126 and 128 is provided.

The notch 122 also includes an outer surface 132 spaced inwardly of the outer side surface of the supporting plate which may be parallel thereto. The plate 120 also includes a longitudinal edge 134 extending longitudinally from the front of the supporting plate, and a laterally extending front edge 136 extending parallel to and adjacent a forward edge 138 of the cutting element 124. Edge 136 extends from the longitudinal edge 134 of the plate 120 to the edge 128 of the notch.

The notch edges 126 and 128 on the supporting plate and the surface 132 of the element plate 120 define an element recess 140 within which the square cutting element 124 is received, with one apex thereof projecting laterally outwardly of the base in a cutting position.

In the FIGURE 3 arrangement, the cutting element 124 is positioned within the recess 140 with one side surface 142 abutting the outer surface 132 of the recess 126 and an opposite side surface 144 in the plane of an inner side surface 146 of the supporting plate. Surface 146 is also coplanar with surface 26.

The cutting element is provided with a mounting hole 148 (similar to that previously described as being provided for the cutting element of the first embodiment), for receiving a connector 150. This connector may be similar to the fastener 66 and engageable with a threaded hole 152 in the tool body 2. Connector 150 passes through an aperture 154 in plate 120 extending inwardly from outer surface 132 thereof, as shown in FIGURE 3, to reach the securing aperture 152 in tool body 2.

The cutting element 124, when secured by connector 150, is restrained against rotational motion about the connector 150 by either one or both of the edges 126 and 128 of the notch 122.

The supporting plate shown in FIGURE 3 includes two countersunk mounting holes 156 and 158 similar to the one provided in the supporting plate of the first embodiment. Holes 156 and 158 receive headed connectors 160 and 162, respectively. These connectors threadedly engage tapped holes 164 and 166, respectively, in the base.

In constructing a boring tool provided with a replaceable cutting element according to the present invention, it will be seen that a substantially more rigid mounting for the cutting element is achieved. In particular, the connector passing through the cutting element prevents any linear motion of the cutting element relative to the base under the loads imposed during boring. Also, the inclined edges of the notch on the supporting plate abutting the rear edges of the cutting element prevent any rotational movement of the cutting element about the connector during boring.

One particularly important advantage of the mounting described is that its effectiveness in preventing movement of the cutting element relative to the tool remains substantially unimpaired by conditions of heat and vibration encountered during boring which may reduce the natural resilience of the materials of which the supporting plate and connectors are formed.

Further advantages are afforded by the manner in which the connectors for the cutting element and supporting plate are recessed below the respective outer surfaces thereof so as to present no obstruction to chip material removed during boring, in its passage from the cutting element.

The flush mounting of the cutting element and supporting plate which places adjacent faces of these three structures in a substantially coplanar alignment also serves to facilitate chip removal. However, under certain circumstances, it may be desirable to incline the face 132 so as to incline the cutting element supported in the notch 126. Such inclination may be desirable to improve the cutting action obtained in connection with certain materials.

As will be further appreciated, variations in cutting action desired for different material may be easily effected by changing supporting plates such that the cutting element engaging recess will in effect rotate the cutting element so as to change the inclination of the cutting edge.

It will be appreciated that the term "inner," "outer," "forward," and "rear," as used to describe boring tool components are merely employed to indicate relative placement of such components with respect to one another and are not intended as a limitation.

Although the invention is described with reference to a preferred embodiment, it will be apparent to those skilled in the art that additions, deletions, modifications, substitutions and other changes not specifically described and illustrated in the preferred embodiment may be made which will fall within the purview of the appended claims.

I claim:

1. A boring tool comprising:
   a rod having a longitudinally extending base,
   a polygonal cutting element, said cutting element including a mounting hole,
   connector means passing through said hole for detachably connecting said cutting element with said base, said cutting element having at least a portion thereof projecting laterally outwardly of said base,
   a supporting plate rigidly and detachably secured to said base, said supporting plate including at least one abutting edge abutting a peripheral edge of said cutting element, said abutting edge rigidly restraining said cutting element against rotational movement about said connector means, a substantially planar outer surface on said cutting element facing outwardly of said base, and a substantially planar outer surface on said supporting plate substantially in the plane of said outer surface on said cutting element.

2. A boring tool comprising a rod having a longitudinally extending base, a polygonal cutting element, said cutting element including a mounting hole, connector means passing through said hole for detachably connecting said cutting element with said base, said cutting element having at least a portion thereof projecting laterally outwardly of said base, and a supporting plate rigidly and detachably secured to said base, said supporting plate including at least one abutting edge abutting a peripheral edge of said cutting element, said abutting edge rigidly restraining said cutting element against rotational movement about said connector means, and a base recess in said base for receiving said supporting plate and said cutting element, said base recess being defined by a base recess face generally parallel to said base and at least two mutually inclined mounting edges extending outwardly from and perpendicular to said base recess face, abutting at least two peripheral edges of said supporting plate.

References Cited

UNITED STATES PATENTS 2,630,725   3/1953   Black _____ 77—58

FOREIGN PATENTS 1,347,086   11/1963   France.

GERALD A. DOST, *Primary Examiner.*